(12) United States Patent
Fukui et al.

(10) Patent No.: US 12,445,004 B2
(45) Date of Patent: Oct. 14, 2025

(54) STATOR AND ROTARY ELECTRIC MACHINE

(71) Applicant: HONDA MOTOR CO., LTD., Tokyo (JP)

(72) Inventors: Kentaro Fukui, Wako (JP); Shinji Kato, Wako (JP); Takashi Wakui, Wako (JP); Noriyuki Yagi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 251 days.

(21) Appl. No.: 18/370,904

(22) Filed: Sep. 21, 2023

(65) Prior Publication Data

US 2024/0106289 A1 Mar. 28, 2024

(30) Foreign Application Priority Data

Sep. 26, 2022 (JP) ................................. 2022-152411

(51) Int. Cl.
*H02K 3/24* (2006.01)
*H02K 3/34* (2006.01)
*H02K 9/19* (2006.01)

(52) U.S. Cl.
CPC ............... *H02K 3/24* (2013.01); *H02K 3/345* (2013.01); *H02K 9/19* (2013.01); *H02K 2213/03* (2013.01)

(58) Field of Classification Search
CPC ........... H02K 3/24; H02K 3/345; H02K 9/19; H02K 2213/03; H02K 15/0421;
(Continued)

(56) References Cited

U.S. PATENT DOCUMENTS

2010/0270094 A1 10/2010 Nakayama et al.
2020/0235625 A1 7/2020 Hishida et al.
(Continued)

FOREIGN PATENT DOCUMENTS

| JP | 2010-259207 | 11/2010 |
| JP | 2015-023739 | 2/2015 |
| WO | 2018/154944 | 8/2018 |

OTHER PUBLICATIONS

Japanese Notice of Allowance for Japanese Patent Application No. 2022-152411 mailed Jun. 18, 2024.

*Primary Examiner* — Christopher M Koehler
*Assistant Examiner* — Viswanathan Subramanian
(74) *Attorney, Agent, or Firm* — Amin, Turocy & Watson, LLP (57) ABSTRACT

A stator includes a cylindrical stator core having a plurality of slots, and a plurality of coils having segment conductors inserted through the plurality of slots and extending in axial direction, a coolant flow channel through which coolant flows is formed between outer circumferential surface of the segment conductor and inner circumferential surface of the slot, the outer circumferential surface of the segment conductor includes first flat surface facing radial direction, second flat surface facing circumferential direction, and a corner portion curved surface connecting the first flat surface and the second flat surface, the corner portion curved surface includes first curved surface continuous with the first flat surface and second curved surface continuous with the second flat surface, and when seen in cross-sectional view perpendicular to the axial direction, radius of curvature of the first curved surface is greater than radius of curvature of the second curved surface.

7 Claims, 4 Drawing Sheets

(58) Field of Classification Search
CPC ............ H02K 15/0414; H02K 15/106; H02K 15/108; H02K 3/12; H02K 3/34
USPC ........................................ 310/215, 179, 201
See application file for complete search history.

(56) References Cited

U.S. PATENT DOCUMENTS

2020/0235627 A1* 7/2020 Matsumoto .............. H02K 1/32
2021/0143693 A1* 5/2021 Nehl ........................ B60L 53/22

* cited by examiner

PRIOR ART

STATOR AND ROTARY ELECTRIC MACHINE

CROSS-REFERENCE TO RELATED APPLICATION

Priority is claimed on Japanese Patent Application No. 2022-152411, filed Sep. 26, 2022, the content of which is incorporated herein by reference.

BACKGROUND OF THE INVENTION

Field of the Invention

The present invention relates to a stator and a rotary electric machine.

Description of Related Art

Japanese Unexamined Patent Application, First Publication No. 2015-23739 discloses a stator of an electric motor including a cylindrical stator core and a plurality of coils. The stator core has a plurality of slots formed at intervals in a circumferential direction. A segment conductor that constitutes the coil is inserted through each slot. Japanese Unexamined Patent Application, First Publication No. 2015-23739 discloses a configuration in which a corner portion of a segment conductor is made to be an arc-shaped (so-called R-shaped) curved surface when seen in a cross-sectional view perpendicular to an axial direction.

SUMMARY OF THE INVENTION

Incidentally, in the field of electric motors, there is a case in which a cooling method in which coils are immersed in coolant (for example, immersed in oil) is sometimes adopted for the purpose of improving cooling efficiency of electric motors. In this method, the coolant such as oil or the like flows through a gap (coolant flow channel) formed between an outer circumferential surface of the segment conductor and an inner circumferential surface of the slot.

Here, when the corner portion of the segment conductor has an arc shape like in Japanese Unexamined Patent Application, First Publication No. 2015-23739, the following problems occur. That is, when a gap between the segment conductor and the slot are increased to increase cooling efficiency, a cross-sectional area of the coil becomes reduced, and there was a possibility that output of the coil may weaken. Meanwhile, if the cross-sectional area of the segment conductor is increased in order to increase the output of the coil, the above-mentioned gap will become smaller, which may increase the pressure loss in the coolant and reduce the cooling efficiency. In addition, when a contact area between the segment conductor and the slot is reduced, the force that tries to fix the segment conductor to the slot weakens, there was a possibility that a position shift and vibrations of the segment conductor may be caused.

An aspect of the present invention is directed to providing a stator and a rotary electric machine that are capable of easily securing a fixing force of a coil with respect to a slot while securing output of the coil and reducing pressure loss in a coolant flow channel.

(1) A stator that is an aspect of the present invention includes a cylindrical stator core having a plurality of slots formed at intervals in a circumferential direction; and a plurality of coils having segment conductors inserted through the plurality of slots and extending in an axial direction, in the slots, a coolant flow channel through which a coolant flows is formed between an outer circumferential surface of the segment conductor and an inner circumferential surface of the slot, the outer circumferential surface of the segment conductor including a first flat surface facing a radial direction, a second flat surface facing a circumferential direction, and a corner portion curved surface connecting the first flat surface and the second flat surface, the corner portion curved surface includes a first curved surface continuous with the first flat surface and a second curved surface continuous with the second flat surface, and when seen in a cross-sectional view perpendicular to the axial direction, a radius of curvature of the first curved surface being greater than a radius of curvature of the second curved surface.

(2) In addition, in the aspect of the above-mentioned (1) of the present invention, when seen in a cross-sectional view perpendicular to the axial direction, provided that a length of the second flat surface is Y [mm] and a cross-sectional area of the segment conductor is X [mm$^2$], Y [mm]≥0.28 [/mm]×X [mm$^2$] is established.

(3) In addition, in the aspect of the above-mentioned (1) or (2) of the present invention, the stator further includes a foaming adhesive sheet which is disposed inside the slot and which is configured to fix the segment conductor to inside of the slot.

(4) In addition, in the aspect of the above-mentioned (3) of the present invention, the foaming adhesive sheet has a foaming adhesive layer that foams and expands due to heating, and a non-foaming adhesive layer that does not foam due to heating, and the segment conductor is in contact with the non-foaming adhesive layer in the foaming adhesive sheet.

(5) In addition, in the aspect of the above-mentioned (3) or (4) of the present invention, in the slot, the foaming adhesive sheet is disposed on only one side of the segment conductor in a circumferential direction.

(6) In addition, in the aspect of any one of the above-mentioned (3) to (5) of the present invention, the plurality of segment conductors arranged in a radial direction are inserted through one of the slots, and the foaming adhesive sheet is in contact with all the plurality of segment conductors.

(7) In addition, a rotary electric machine, which is another aspect of the present invention, includes a stator of any one of the above-mentioned aspects (1) to (6).

According to the aspect of the above-mentioned (1) of the present invention, it is possible to provide the stator that easily secures the fixing force of the coil with respect to the slot while simultaneously securing output of the coil and reducing pressure loss in the coolant flow channel.

According to the aspect of the above-mentioned (2) of the present invention, the fixing of the coil with respect to the slot can be further stabilized.

According to the aspect of the above-mentioned (3) of the present invention, the fixing force of the coil with respect to the slot can be increased.

According to the aspect of the above-mentioned (4) of the present invention, it is possible to reduce the likelihood that the coolant flow channel becomes narrow due to foaming of the foaming adhesive layer.

According to the aspect of the above-mentioned (5) of the present invention, the cross-sectional area of the segment conductor is increased, making it easier to secure the output of the coil.

According to the aspect of the above-mentioned (6) of the present invention, the output of the coil can be increased. In addition, the plurality of segment conductor can be reliably fixed to the slot.

According to the aspect of the above-mentioned (7) of the present invention, while securing the output of the coil and reducing pressure loss in the coolant flow channel, it is possible to provide the rotary electric machine that easily secures the fixing force of the coil to the slot.

DETAILED DESCRIPTION OF THE INVENTION

Hereinafter, a stator and a rotary electric machine according to an embodiment of the present invention will be described with reference to the accompanying drawings.

Figure 1:
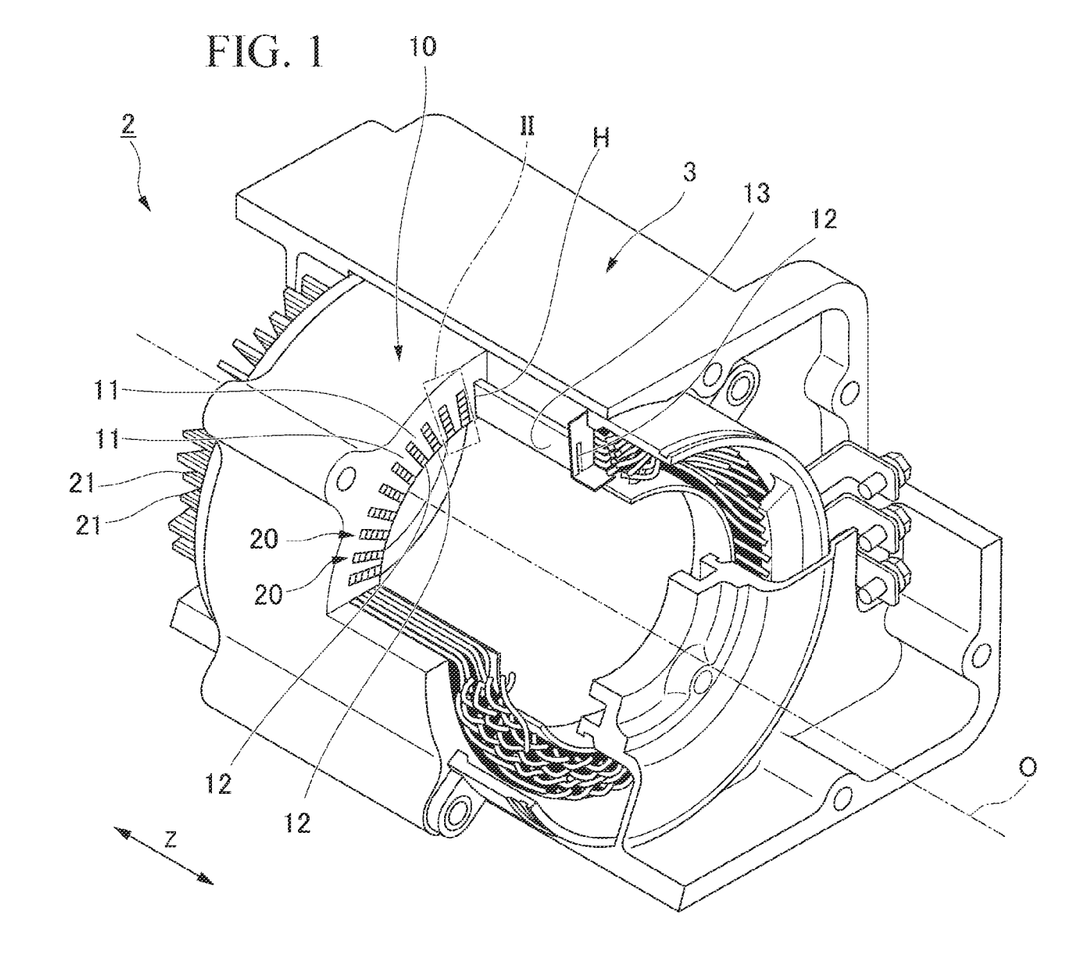
FIG. 1 is a partially cutaway view showing a rotary electric machine according to an embodiment of the present invention.

FIG. 1 is a partially cutaway view showing a rotary electric machine (electric motor) 2 according to the embodiment. As shown in FIG. 1, the rotary electric machine 2 according to the embodiment includes a stator 1, and a case 3 configured to accommodate the stator 1. The stator 1 is fixed to the case 3. The stator 1 has a cylindrical stator core 10, and a plurality of coils 20 attached to the stator core 10.

A rotor (not shown) is disposed inside the stator core 10. The rotor is rotated around a rotation axis O by the magnetic field generated by the stator 1. The rotor has, for example, a shaft extending along the rotation axis O, and a rotor core fixed to a shaft having a permanent magnet. However, a type or a configuration of the rotor is not particularly limited as long as the rotor is rotated around the rotation axis O by the magnetic field generated by the stator 1.

(Definition of Directions)

Here, in the embodiment, a direction parallel to the rotation axis O is referred to as a Z direction or an axial direction Z. A cross section perpendicular to the axial direction Z is referred to as a lateral cross section. A direction perpendicular to the rotation axis O when seen in the axial direction Z is referred to as a radial direction. An orientation approaching the rotation axis O in the radial direction is referred to as inward in the radial direction, and an orientation separating away from the rotation axis O is referred to as outward in the radial direction. A direction rotating around the rotation axis O when seen in the axial direction Z is referred to as a circumferential direction. As shown in FIG. 1, the stator core 10 according to the embodiment has a substantially cylindrical shape about the rotation axis O. The stator core 10 is formed by stacking, for example, a plurality of magnetic steel plates. The stator core 10 according to the embodiment has a plurality of teeth 11, and a plurality of slots 12.

Figure 2:
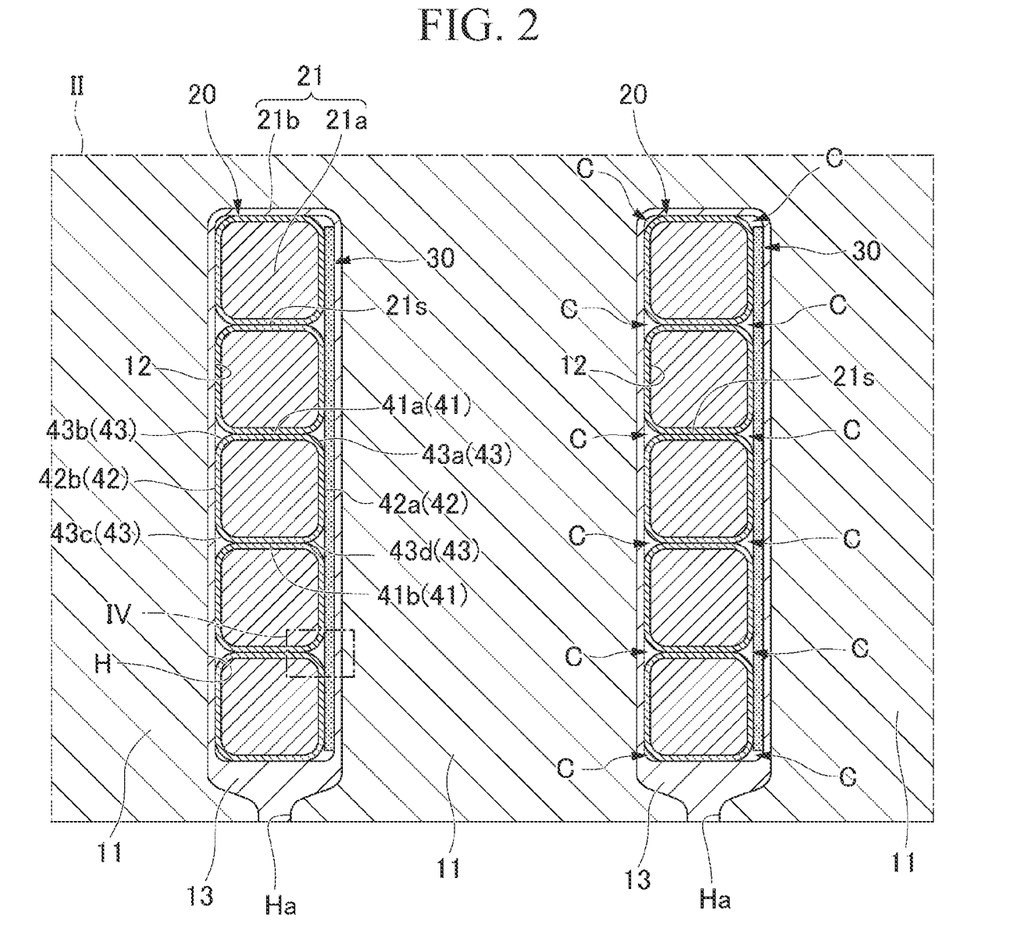
FIG. 2 is an enlarged view showing a region II shown in FIG. 1.

The plurality of slots 12 are formed at intervals (for example, equal intervals) in the circumferential direction. The slots 12 are spaces, through which segment conductors 21 that constitute the coils 20 are inserted, and extending in the axial direction Z. Specifically, as shown in FIG. 2, a plurality of the slot holes H that open in the inner circumferential surface of the stator core 10 are formed in the stator core 10 according to the embodiment. The plurality of the slot holes H are disposed at intervals in the circumferential direction throughout the entire circumference of the stator core 10. Then, as shown in FIG. 2, insulating portions 13 are inserted in the slot holes H, and holes formed in the insulating portions 13 become the slots 12.

The insulating portions 13 are in contact with the inner circumferential surfaces of the slot holes H throughout the entire circumference when seen in a lateral cross-sectional view. In addition, the insulating portions 13 close opening portions Ha of the slot holes H. The insulating portions 13 are formed of a material with no conductivity (for example, a resin). The insulating portions 13 prevent the segment conductors 21 (the coils 20) and the teeth 11 (the stator core 10) from being electrically connected.

The plurality of teeth 11 are provided at intervals (for example, equal intervals) in the circumferential direction. Each of the teeth 11 is disposed between an adjacent two slots 12 in the circumferential direction. In the embodiment, each of the teeth 11 is adjacent to two insulating portions 13 in the circumferential direction. In addition, each of the teeth 11 has a shape protruding inward in the radial direction (see also FIG. 1) and faces the rotor (not shown) in the radial direction.

The coils 20 have the segment conductors 21 extending in the axial direction Z and inserted through the slots 12, and coil ends (not shown). The segment conductors 21 and the coil ends form a shape in which the coils 20 are wound around each of the teeth 11. The plurality of coils 20 are constituted by, for example, 3 phases. That is, at least one coil corresponding to each of a U phase, a V phase and a W phase is included in the plurality of coils 20. In the embodiment, the plurality of (in the example shown, five) segment conductors 21 are inserted through one of the slots 12. In addition, the plurality of segment conductors 21 inserted into one of the slots 12 are arranged in the radial direction when seen in a lateral cross-sectional view.

When a current is applied to the coils 20, each of the teeth 11 of the stator 1 generates a magnetic field that contributes to the rotation of the rotor. Continuous rotation of the rotor is realized by a magnetic attractive force or repulsive force that the magnetic field exerts on the rotor.

As shown in FIG. 2, an outer circumferential surface 21s of each of the segment conductors 21 includes a pair of first flat surfaces 41, a pair of second flat surfaces 42, and four corner portion curved surfaces 43. Each of the first flat surfaces 41 is a flat surface facing the radial direction. Each of the second flat surfaces 42 is a flat surface facing the circumferential direction. Each of the corner portion curved surfaces 43 is a curved surface which is located on a corner portion of the segment conductor 21 when seen in a lateral cross-sectional view, and which connects the first flat surface 41 and the second flat surface 42. That is, the segment conductor 21 has a substantially rectangular shape when seen in a lateral cross-sectional view.

Hereinafter, description may be performed by attaching reference sign 41a to a surface of the pair of first flat surfaces 41 facing outward in the radial direction (upward in the drawing) and attaching reference sign 41b to a surface facing inward in the radial direction (inward in the drawing).

In addition, both the first flat surfaces 41a and 41b may be simply referred to as "the first flat surfaces 41" when they are not distinguished. In addition, description may be performed by attaching reference sign 42a to a surface of the pair of second flat surfaces 42 facing one side in the circumferential direction (rightward in the drawing) and attaching reference sign 42b to a surface facing the other side (leftward in the drawing). In addition, both the second flat surfaces 42a and 42b may be simply referred to as "the second flat surfaces 42" when they are not distinguished. In addition, among the four corner portion curved surfaces 43, description may be performed by attaching reference sign 43a to a surface which connects the first flat surface 41a and the second flat surface 42a, attaching reference sign 43b to a surface connecting the first flat surface 41a and the second flat surface 42b, attaching reference sign 43c to a surface connecting the first flat surface 41b and the second flat surface 42b, and attaching reference sign 43d to a surface connecting the first flat surface 41b and the second flat surface 42a. In addition, the four corner portion curved surfaces 43a, 43b, 43c and 43d may be simply referred to as "the corner portion curved surfaces 43" when they are not distinguished.

In the embodiment, foaming adhesive sheets 30 are disposed in each of the slots 12. The foaming adhesive sheet 30 is a sheet extending in the radial direction and the axial direction Z. The foaming adhesive sheets 30 have a role of fixing the segment conductors 21 in the slots 12. In other words, the foaming adhesive sheets 30 have a role of fixing the coils 20 to the stator core 10. The foaming adhesive sheets 30 are in contact with all the plurality of segment conductors 21 arranged in the radial direction in each of the slots 12. In addition, the foaming adhesive sheets 30 are disposed on only one side of the segment conductors 21 in the circumferential direction. In other words, the foaming adhesive sheets 30 are disposed to come into contact with only the second flat surface 42a among the pair of second flat surfaces 42a and 42b provided in the segment conductors 21.

Figure 3A:
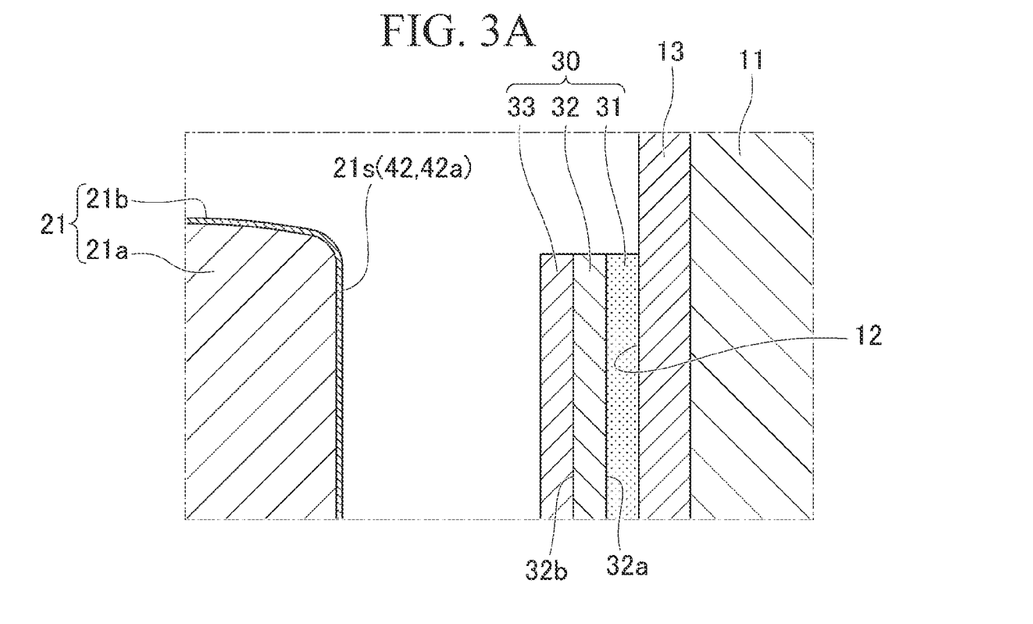
FIG. 3A is a view for describing a foaming adhesive sheet according to the embodiment of the present invention.

As shown in FIG. 3A, the foaming adhesive sheet 30 according to the embodiment has a foaming adhesive layer 31, a substrate 32, and a non-foaming adhesive layer 33. The substrate 32 has a first surface 32a directed in the circumferential direction, and a second surface 32b located at a side opposite to the first surface 32a. The foaming adhesive layer 31 is formed on the first surface 32a of the substrate 32, and the non-foaming adhesive layer 33 is formed on the second surface 32b of the substrate 32. That is, the foaming adhesive layer 31, the substrate 32, and the non-foaming adhesive layer 33 are laminated in sequence in the circumferential direction. The foaming adhesive layer 31 is a layer having an adhesive property and that forms and expands due to heating (see FIG. 3B). In the embodiment, the foaming adhesive sheet 30 is fixed to the inside of the slot 12 due to the contact between the foaming adhesive layer 31 and the inner circumferential surface of the slot 12. The foaming adhesive layer 31 is formed of, for example, an epoxy resin.

The non-foaming adhesive layer 33 is a layer having an adhesive property and that does not foam due to heating. In the embodiment, the non-foaming adhesive layer 33 is fixed to each of the segment conductors 21 due to the contact between the non-foaming adhesive layer 33 and the outer circumferential surface 21s (the second flat surface 42a) of each of the segment conductors 21. The non-foaming adhesive layer 33 is formed of, for example, an epoxy resin.

Figure 3B:
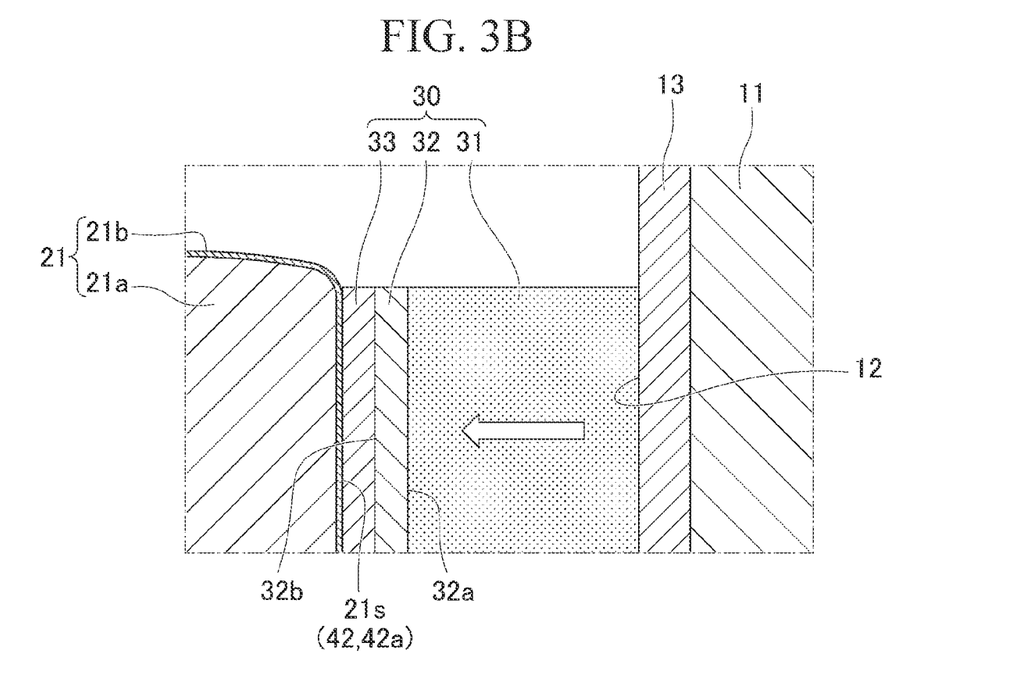
FIG. 3B is a view showing a state coming after that of FIG. 3A.

In order to fix the segment conductors 21 to the slots 12 using the foaming adhesive sheets 30 configured as above, the foaming adhesive sheets 30 may be heated after inserting each of the segment conductors 21 into the slots 12. Accordingly, the foaming adhesive layer 31 expands, and the foaming adhesive layer 33 comes into contact with all the segment conductors 21. Accordingly, even if the positions of the segment conductors 21 inside the slots 12 vary, all the segment conductors 21 can be reliably fixed to the slots 12.

As shown in FIG. 2, in each of the slots 12, a gap in which neither the segment conductor 21 nor the foaming adhesive sheet 30 is disposed is formed between the outer circumferential surface 21s of the segment conductor 21 and the inner circumferential surface of the slot 12. This gap is used as a coolant flow channel C through which coolant (such as oil) flows to cool the coils 20. Further, the reason why there is a gap as the coolant flow channel C is that the corner portion curved surface 43 is provided on the outer circumferential surface 21s of each of the segment conductors 21. When the plurality of segment conductors 21 arranged in the radial direction come into contact with each other, a space surrounded by the inner circumferential surface of the slot 12 and the corner portion curved surface 43b and 43c and a space surrounded by the non-foaming adhesive layer 33 and the corner portion curved surfaces 43a and 43d become the coolant flow channel C.

Here, from the viewpoint of increasing the cooling efficiency of the coils 20, it is desirable to reduce the cross-sectional area of the segment conductors 21 to widen the coolant flow channel C and reduce the pressure loss that occurs in the coolant in the coolant flow channel C. Meanwhile, from the viewpoint of increasing the output of the coils 20, it is desirable to increase the cross-sectional area of the segment conductors 21. In addition, from the viewpoint of securing the fixing force of the coils 20 to the slots 12, it is desirable to increase the contact area between the segment conductors 21 and the slots 12 and the contact area between the segment conductors 21 and the foaming adhesive sheets 30 (that is, the area of the second flat surfaces 42).

Figure 4A:
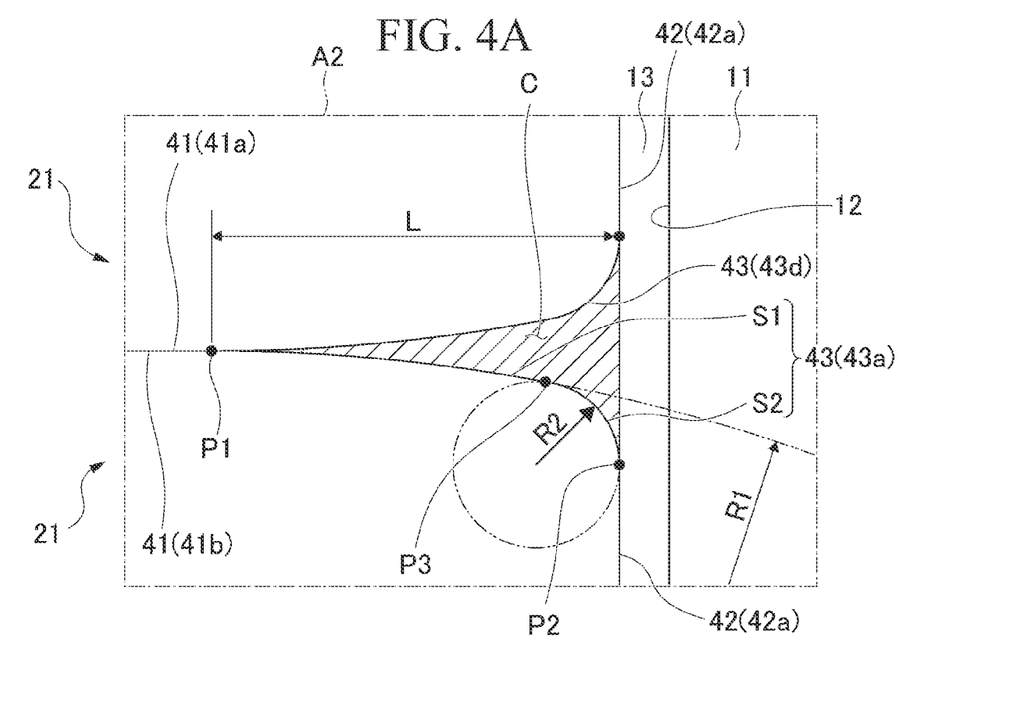
FIG. 4A is an enlarged view showing a region IV shown in FIG. 2.

In the stator 1 according to the embodiment, in order to simultaneously secure the output of the coils 20, reduce the pressure loss in the coolant flow channel C, and secure the fixing force of the coils 20 with respect to the slots 12, the following features are applied to the corner portion curved surfaces 43. That is, as shown in FIG. 4A, the corner portion curved surface 43 according to the embodiment includes a first curved surface S1 continuous with the first flat surfaces 41, and a second curved surface S2 continuous with the second flat surfaces 42. In addition, when seen in a lateral cross-sectional view, a radius of curvature R1 of the first curved surface S1 is greater than a radius of curvature R2 of the second curved surface S2. Further, shapes of the corner portion curved surfaces 43a to 43d are the same as each other.

Figure 4B:
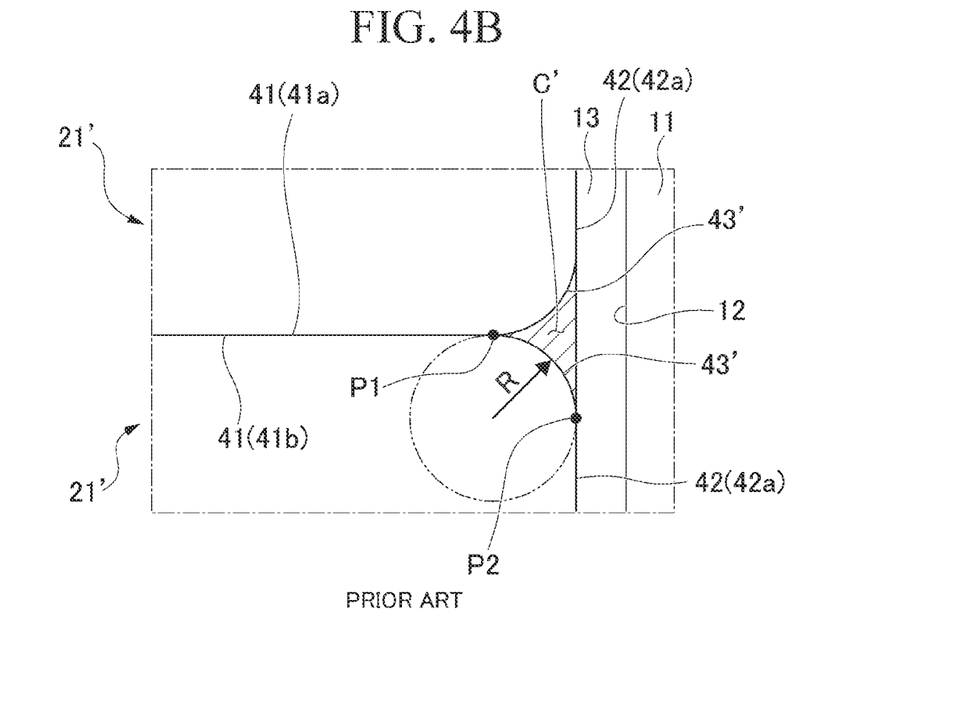
FIG. 4B is an enlarged view showing a corner portion curved surface in the related art.

FIG. 4A is an enlarged view of the corner portion curved surfaces 43 provided in the two segment conductors 21 adjacent to each other in the radial direction. FIG. 4B is an enlarged view of the corner portion curved surfaces 43' in the related art with a fixed radius of curvature of R. As shown in FIG. 4A and FIG. 4B, the corner portion curved surfaces 43 according to the embodiment have a connecting point P1 of the first flat surfaces 41 and the corner portion curved surfaces 43, which enters inward in the circumferential direction of the segment conductors 21 (a left side in the drawing), compared to the corner portion curved surfaces 43' in the related art. Accordingly, a dimension L of the coolant flow channel C in the circumferential direction is increased. Accordingly, by employing the corner portion curved surfaces 43 according to the embodiment, the cross-sectional area (an area when seen in a lateral cross-sectional view) of the coolant flow channel C can be increased, and the pressure loss occurred in the coolant in the coolant flow channel C can be reduced.

In addition, in the example of FIG. 4B, in order to increase the cross-sectional area of the coolant flow channel C', it is necessary to increase a radius of curvature R of the corner portion curved surfaces 43'. Here, the connecting point P1 of the first flat surface 41a and the corner portion curved surface 43a is moved inward in the circumferential direction (leftward in the drawing) of the segment conductor 21, and a connecting point P2 of the second flat surface 42a and the corner portion curved surfaces 43b and 43d is moved inward (downward in the drawing) in the radial direction. The area of the second flat surface 42a and the cross-sectional area of the segment conductor 21 are reduced due to movement of the connecting points P1 and P2. Meanwhile, in the corner portion curved surfaces 43 shown in FIG. 4A, for example, by increasing only the radius of curvature R2 of the second curved surface S2 of the curved surfaces S1 and S2, the cross-sectional area of the coolant flow channel C can be expanded without significantly changing the position of the connecting point P2. Accordingly, reduction in the area of the second flat surface 42a and the cross-sectional area of the segment conductor 21 can be suppressed. Accordingly, both reduction in pressure loss in the coolant flow channel C and securing the fixing force of the coils 20 with respect to the slots 12 and the output of the coils 20 can be easily realized.

Incidentally, the force required to stably fix the coils 20 with respect to the slots 12 (required fixing force) is proportional to the output of the coils 20. In addition, the output of the coils 20 depends on the cross-sectional area of the segment conductors 21. Accordingly, as the cross-sectional area of the segment conductors 21 is increased, there is a need to increase the contact area between the segment conductors 21 and the slots 12 and the contact area between the segment conductors 21 and the foaming adhesive sheets 30 (i.e., the area of the second flat surfaces 42). As a result of intensive studies by the inventors of the present application, it was found that the coils 20 can be stably fixed with respect to the slots 12 by designing the segment conductors 21 so that the following equation a is established. Further, in the equation a, Y [mm] is a length of the second flat surfaces 42 when seen in a lateral cross-sectional view, and X [mm$^2$] is a cross-sectional area of the segment conductors 21 when seen in a lateral cross-sectional view.

$$a: Y[\text{mm}] \geq 0.28 [/\text{mm}] \times X[\text{mm}^2]$$

As described above, the stator 1 according to the embodiment includes the cylindrical stator core 10 having the plurality of slots 12 formed at intervals in the circumferential direction, and the plurality of coils 20 inserted through the plurality of slots 12 and having the segment conductors 21 extending in the axial direction Z, in the slots 12, the coolant flow channel C through which coolant flows is formed between the outer circumferential surfaces 21s of the segment conductors 21 and the inner circumferential surfaces of the slots 12, the outer circumferential surfaces 21s of the segment conductors 21 include the first flat surfaces 41 facing the radial direction, the second flat surfaces 42 facing the circumferential direction, and the corner portion curved surfaces 43 connecting the first flat surfaces 41 and the second flat surfaces 42, the corner portion curved surfaces 43 include the first curved surface S1 continuous with the first flat surfaces 41 and the second curved surface S2 continuous with the second flat surfaces 42, and when seen in a lateral cross-sectional view, the radius of curvature R1 of the first curved surface S1 is greater than the radius of curvature R2 of the second curved surface S2.

According to this configuration, the cross-sectional area of the coolant flow channel C can be increased by increasing the dimension L of the coolant flow channel C in the circumferential direction. Accordingly, the pressure loss occurred in the coolant in the coolant flow channel C can be reduced. In addition, the reduction of the area of the second flat surface 42a and the cross-sectional area of the segment conductors 21 is suppressed, and the fixing force of the coils 20 with respect to the slots 12 and the output of the coils 20 are easily secured. That is, while securing the output of the coils 20 and reducing the pressure loss in the coolant flow channel C, it is possible to provide a stator that easily secures the fixing force of the coils 20 with respect to the slots 12.

In addition, when seen in a lateral cross-sectional view, provided that a length of the second flat surfaces 42 is Y [mm] and the cross-sectional area of the segment conductors 21 is X [mm$^2$], Y [mm] $\geq$ 0.28 [/mm] $\times$ X [mm$^2$] may be established. According to the configuration, it is possible to further stabilize the fixing of the coils 20 with respect to the slots 12.

In addition, the stator 1 according to the embodiment further includes the foaming adhesive sheets 30 which is disposed inside the slots 12 and which is configured to fix the segment conductors 21 inside of the slots 12. According to the configuration, it is possible to increase the fixing force of the coils 20 to the slots 12. In addition, the foaming adhesive sheet 30 has the foaming adhesive layer 31 that foams and expands due to heating, and the non-foaming adhesive layer 33 that does not foam due to heating, and the segment conductors 21 come into contact with the non-foaming adhesive layer 33 of the foaming adhesive sheets 30. If the foaming adhesive layer 31 comes into contact with the segment conductors 21, there is a possibility that a foamed part of the foaming adhesive layer 31 may adhere to the corner portion curved surfaces 43 and the coolant flow channel C may be narrowed. As the orientations of the foaming adhesive sheets 30 are set such that the non-foaming adhesive layer 33 comes into contact with the segment conductors 21, narrowing of the coolant flow channel C caused by the foaming of the foaming adhesive layer 31 can be suppressed.

In addition, in the slots 12, the foaming adhesive sheets 30 are disposed only on one side of the segment conductors 21 in the circumferential direction. According to this configuration, compared to the case in which the foaming adhesive sheets 30 are disposed on both sides of the segment conductors 21, the cross-sectional area of the segment conductors 21 can be increased. Accordingly, it becomes easier to secure the output of the coils 20.

In addition, the plurality of segment conductors 21 arranged in the radial direction are inserted through one of the slots 12, and the foaming adhesive sheets 30 are in contact with all the plurality of segment conductors 21. According to this configuration, compared to the case in which only one of the segment conductors 21 is inserted through one of the slots 12, the output of the coils 20 can be increased. In addition, since the foaming adhesive sheets 30 are in contact with all the plurality of segment conductors 21, all the segment conductors 21 can be reliably fixed with respect to the slots 12.

In addition, the rotary electric machine 2 according to the embodiment includes the above-mentioned stator 1. According to this configuration, it is possible to provide a rotary electric machine that easily secures the fixing force of the coils 20 with respect to the slots 12 while securing the output of the coils 20 and reducing the pressure loss in the coolant flow channel C.

Further, the technical scope of the present invention is not limited to the embodiment, and various modifications may be made without departing from the scope of the present invention.

For example, the foaming adhesive sheets 30 may be disposed such that the foaming adhesive layer 31 is in contact with the segment conductors 21. In addition, in each of the slots 12, the foaming adhesive sheets 30 may be disposed on both sides of the segment conductors 21 in the circumferential direction. In addition, in each of the slots 12, the foaming adhesive sheets 30 may not come into contact with some of the segment conductors 21. In this case, the foaming adhesive sheets 30 may come into contact with the segment conductors 21 in the radial direction other than the circumferential direction. In addition, the foaming adhesive sheets 30 may come into contact with the segment conductors 21 in both the circumferential direction and the radial direction. Alternatively, the stator 1 may not include the foaming adhesive sheets 30 as long as the coils 20 can be fixed to the stator core 10.

In addition, the number of the segment conductors 21 inserted through each of the slots 12 can be appropriately changed. That is, one or more and four or less segment conductors 21 may be inserted through each of the slots 12, or six or more segment conductors 21 may be inserted therethrough.

In addition, while the plurality of segment conductors 21 are in contact with the first flat surfaces 41a and 41b in the example shown, a gap may be generated between the first flat surfaces 41a and 41b. In this case, the gap between the first flat surfaces 41a and 41b may function as the coolant flow channel C.

In addition, while the first curved surface S1 and the second curved surface S2 are connected to each other at a connecting point P3 in the example shown, another curved surface may be provided between the first curved surface S1 and the second curved surface S2. Even in this case, by applying to the corner portion curved surfaces 43 such a shape that the radius of curvature increases from the connecting point P1 toward the connecting point P2, the same effect as in the embodiment can be obtained.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A stator comprising:
a cylindrical stator core having a plurality of slots formed at intervals in a circumferential direction; and
a plurality of coils having segment conductors inserted through the plurality of slots and extending in an axial direction,
wherein, in the slots, a coolant flow channel bound by a corner portion through which a coolant flows is formed between an outer circumferential surface of the segment conductor and an inner circumferential surface of the slot,
the outer circumferential surface of the segment conductor includes a first flat surface facing a radial direction, a second flat surface facing a circumferential direction, and the corner portion curved surface connecting the first flat surface and the second flat surface,
the corner portion curved surface includes a first curved surface continuous with the first flat surface and a second curved surface continuous with the second flat surface, and
when seen in a cross-sectional view perpendicular to the axial direction, a radius of curvature of the first curved surface is greater than a radius of curvature of the second curved surface.

2. The stator according to claim 1, wherein, when seen in a cross-sectional view perpendicular to the axial direction, provided that a length of the second flat surface is Y [mm] and a cross-sectional area of the segment conductor is X [mm$^2$], Y [mm]≥0.28 [/mm]×X [mm$^2$] is established.

3. The stator according to claim 1, further comprising a foaming adhesive sheet which is disposed inside the slot and which is configured to fix the segment conductor to an inside of the slot.

4. The stator according to claim 3, wherein the foaming adhesive sheet has a foaming adhesive layer that foams and expands due to heating, and a non-foaming adhesive layer that does not foam due to heating, and
the segment conductor is in contact with the non-foaming adhesive layer in the foaming adhesive sheet.

5. The stator according to claim 3, wherein, in the slot, the foaming adhesive sheet is disposed on only one side of the segment conductor in the circumferential direction.

6. The stator according to claim 3, wherein the plurality of segment conductors arranged in the radial direction are inserted through one of the slots, and the foaming adhesive sheet is in contact with all the plurality of segment conductors.

7. A rotary electric machine comprising the stator according to claim 1.

* * * * *